US006100507A

United States Patent [19]

Von Mosshaim

[11] Patent Number: 6,100,507

[45] Date of Patent: Aug. 8, 2000

[54] TABLE TOP MODEL HOT PLATE OR WARMING PLATE APPLIANCE

[76] Inventor: Horst Mosshammer Von Mosshaim, 2500 Corporate Exchange Suite 200, Columbus, Ohio 43231

[21] Appl. No.: 09/403,901

[22] PCT Filed: Jan. 26, 1998

[86] PCT No.: PCT/ZW98/00001

§ 371 Date: Oct. 28, 1999

§ 102(e) Date: Oct. 28, 1999

[87] PCT Pub. No.: WO98/41057

PCT Pub. Date: Sep. 17, 1998

[30] Foreign Application Priority Data

Jan. 26, 1997 [ZA] South Africa ............................ 966367

[51] Int. Cl.[7] ........................................................ H05B 3/68

[52] U.S. Cl. ..................................... 219/451.1; 219/465.1

[58] Field of Search ............................. 219/450.1, 451.1, 219/452.11, 460.1, 461.1, 465.1, 466.1, 467.1, 468.1, 468.2, 524, 536, 537; 126/1 R, 25 R, 30, 27, 90 A, 92 A, 92 B

[56] References Cited

U.S. PATENT DOCUMENTS

| | | | |
|---|---|---|---|
| 2,306,979 | 12/1942 | Potsdam | 219/465.1 |
| 2,563,875 | 4/1951 | Salton | 219/466.1 |
| 2,715,173 | 8/1955 | Farquharson | 219/465.1 |
| 5,508,495 | 4/1996 | Yahav et al. | 219/466.1 |

*Primary Examiner*—Sang Paik

*Attorney, Agent, or Firm*—Young & Thompson

[57] ABSTRACT

A table top model hot plate or warming plate appliance wherein the side walls of the appliance have circular to oval outlines in plan view, substantially following the outlines of the vitreous ceramic top except for a hollow protrusion forming a substantially planar control panel surface which on one side merges substantially tangentially with the circular to oval outlines of the side walls and on the other side terminates in a corner-forming wall, returning to meet the side walls having circular to oval outlines, the hollow protrusion forming a box-like cavity accommodating control apparatus for the heating elements and the control panel carrying one or more operating and/or control buttons, touch pads, knobs and/or dials and optionally one or more pilot lights.

16 Claims, 3 Drawing Sheets

TABLE TOP MODEL HOT PLATE OR WARMING PLATE APPLIANCE

FIELD OF THE INVENTION

The present invention relates to a table top model hot plate or warming plate appliance comprising a vitreous ceramic top mounted on a body, including peripheral side walls and enclosing one or more heating elements underneath the vitreous ceramic top, the side walls of the appliance being upright, and terminating in formations, supporting and positioning edges of said vitreous ceramic top which has substantially circular to oval outlines.

BACKGROUND OF THE INVENTION

Swiss patent specification CH 654646 A5 discloses a hot plate having ovaloid or ellipsoidal outlines in plan view European patent application 0223966 A1 discloses a vitreous ceramic hot plate having circular outlines which according to the description, may also be ovaloid. In both cases the control means such as switches, temperature regulating apparatus and the like project from the side of the appliance without in any way having been integrated functionally, or design wise into the overall design and construction of the body of the appliance. They create the impression of having been added on by sheer necessity virtually as an afterthought and no attempt has been made to create a cavity for accommodating these control means in a manner which is both functionally integrated into the overall design of the housing as well as providing an aesthetically pleasing overall design concept.

Accordingly, there exists a need for appliances of the type set out above which overcome these criticisms and which provide accommodation for the control apparatus for such hot or heating plates, satisfactorily functionally separated from the radiating heating elements and yet neatly stowed away within the outlines of the body of the appliance.

SUMMARY OF THE INVENTION

In accordance with the invention, there is provided a table top model hot plate or warming plate appliance of the type aforesaid wherein the side walls of the appliance have circular to oval outlines in plan view, substantially following vitreous ceramic top except for a hollow protrusion forming a substantially planar control panel surface which on one side merges substantially tangentially with the circular to oval outlines of the said side walls and on the other side terminates in a corner-forming wall, returning to meet the side walls having circular to oval outlines, the hollow protrusion forming a box-like cavity accommodating control apparatus for the heating elements and the control panel carrying one or more operating and/or control buttons, touch pads, knobs and/or dials and optionally one or more pilot lights.

In a preferred embodiment the corner forming wall is at a right angle to the control panel. Preferably the corner-forming wall meets the circular to oval outlines in non-tangential relationship.

In a particularly preferred embodiment the plan view outlines of the side walls are defined at one end by a hemicircle, its two hemicircle ends merging tangentially with two parallel straight lines one of which in turn merges tangentially with the first end of a further circle segment, whereas the other continues rectilinearly to form the control panel, terminating at its far end in said corner forming wall which latter meets the second end of said further circle segment. More particularly the outside of the corner-forming wall meets the outside of the further circle segment at an obtuse angle.

Preferably the heating elements comprise a first element having circular outlines and a second element having moon crescent-shaped outlines adjoining the first element.

BRIEF DESCRIPTION OF THE DRAWINGS

In the following the invention will be further described by way of example with reference to the accompanying drawings.

In the drawings

DETAILED DESCRIPTION OF THE INVENTION

Figure 1:
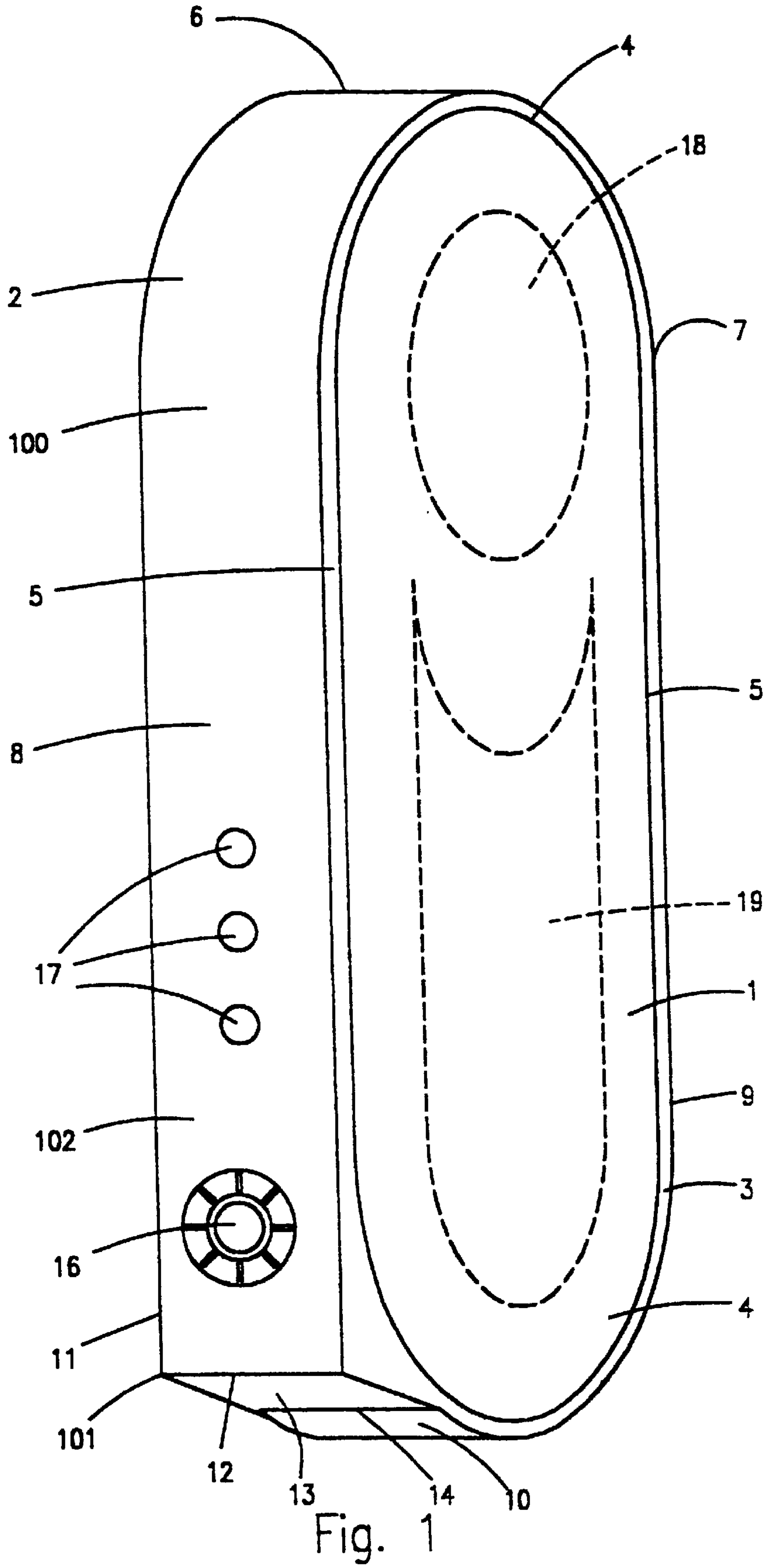
FIG. 1 represents a perspective view of an embodiment of a table top model hot plate or warming plate appliance according to the invention.
Figure 3:
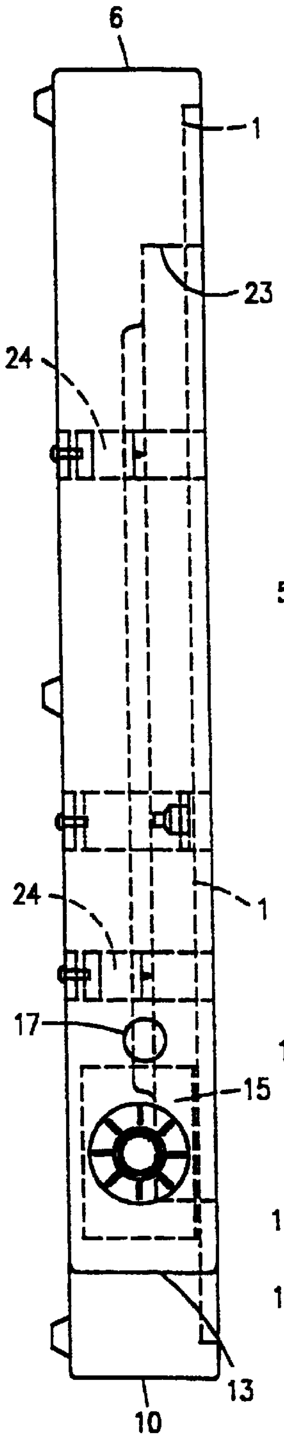
FIG. 3 represents a front elevation of the apparatus shown in FIGS. 1 and 2 and FIG. 4 represents a vertical section along line IV—IV in FIG. 2.

Referring to the drawings, the appliance according to the invention comprises a dark coloured glass-like vitreous ceramic top 1 and a body 2 made of heat-resistant plastics or enamel coated press-moulded sheet metal. The body 2 optionally terminates on top in a rim 3 closely corresponding to the approximately ovaloid outlines of the vitreous ceramic top which is supported on an invertly directed shoulder of the body 2 (not shown) and adhesively bonded thereto in a manner known per se with a silicon adhesive providing a substantially sealing relationship between the top and the body. The rim 3 may also be omitted in which case the oval outlines of the top of the appliance are formed by the edge of the vitreous ceramic top 1.

The oval outlines of the top 1 correspond essentially to two hemi-circular end portions 4 interconnected by two parallel straight lines 5 merging tangentially with the ends of the s. Except as will be explained in what follows, the side walls 100 of the body 2 follow a similar configuration in plan view, being defined at one end by a hemicircle 6 merging tangentially with two parallel rectilinear portions 7 and 8 representing the rear and the front respectively of the body 2. The rectilinear rear portions 7 also merge tangentially approximately at 9, with the end wall 10 which in plan view follows the outlines of a circle segment having the same radius of curvature as the end portion 6. However, in contrast to the rear wall 7, the front wall 8 in order to form the control panel 102 is continued rectilinearly towards the right in the drawings beyond the imaginary point of tangential merging with the circular segment 10, had the latter followed the outlines of a fill hemicircle. This extended rectilinear portion 11 forms a hollow protrusion 101, which is terminated by a rectangular corner 12 formed between the portion 11 and a straight corner forming wall 13 which meets the second end of the circle segment shaped wall portion 10 at an obtuse angle at 14.

It will be understood that the principle of the invention could also be realised by causing the portion 11 to extend even further to the right so that the side wall portion 13 would merge tangentially with the curved wall portion 10 as indicated by a broken line 13'. It will likewise be understood that the principle of the invention could equally be applied to a hot plate having a vitreous ceramic top of circular outlines in plan view. In that case, the outlines of wall portions 6 and 10 would form part of a common single circle and the rectilinear rear wall 7 would fall away. The rectilinear rear wall 7 could also be replaced by an arcuate wall. It is also not essential for the hemicircle 6 and the circular segment 10 to have identical radii of curvature.

Figure 2:
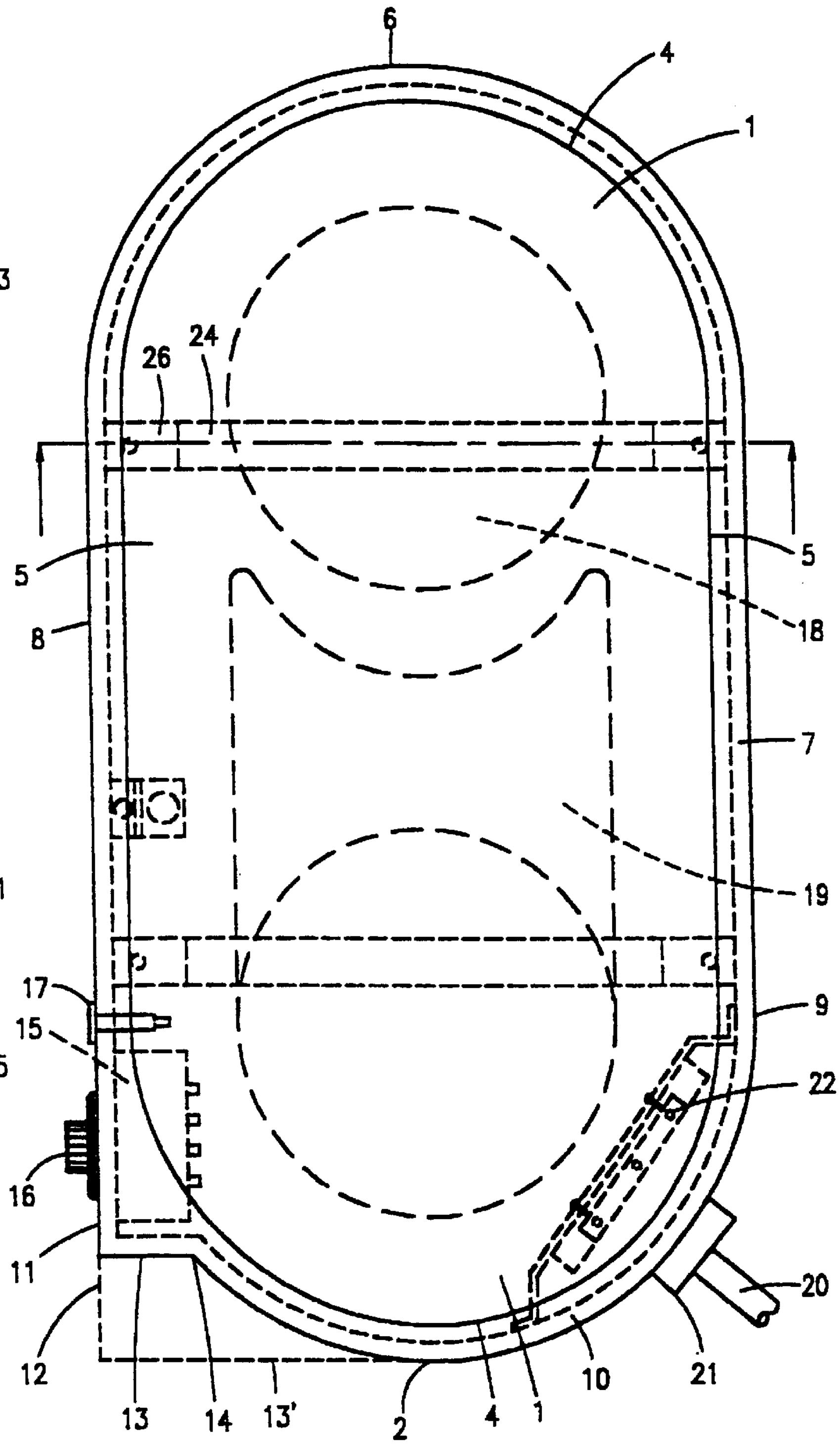
FIG. 2 represents a plan view of the apparatus illustrated in FIG. 1.

As more clearly shown in the plan view of FIG. 2, the corner region formed between the extended straight wall portion 11 and the corner forming wall 13, forms a box-like cavity in which is accommodated the switch mechanism 15 operated by a turning dial 16 mounted on the face of the switchboard panel 8, 11. The switchboard panel also carries three pilot lights 17, one for each of two heating elements 18 and 19 respectively and one being connected to a residual heat sensor (not illustrated) which glows for as long as the hot plate is still above a certain threshold temperature but not necessarily a temperature at which glowing of the element's heat is visible through the vitreous ceramic top.

Referring specifically to FIG. 2, a connecting lead 20 passes by way of a gland 21 through the end wall 10 to a terminal block 22 accommodated inside the body 2 and underneath the top 1. The heating elements are mounted in a heating element body of refractory material accommodated in a tray 23, supported by two spring brackets 24. screwed with self-tapping screws 25 (see FIG. 4) onto transverse rigid support brackets 26 forming the bottom ends of walls 7, 8. The spring brackets 24 push the element assembly with spring action against the underside of the top 1.

Figure 4:
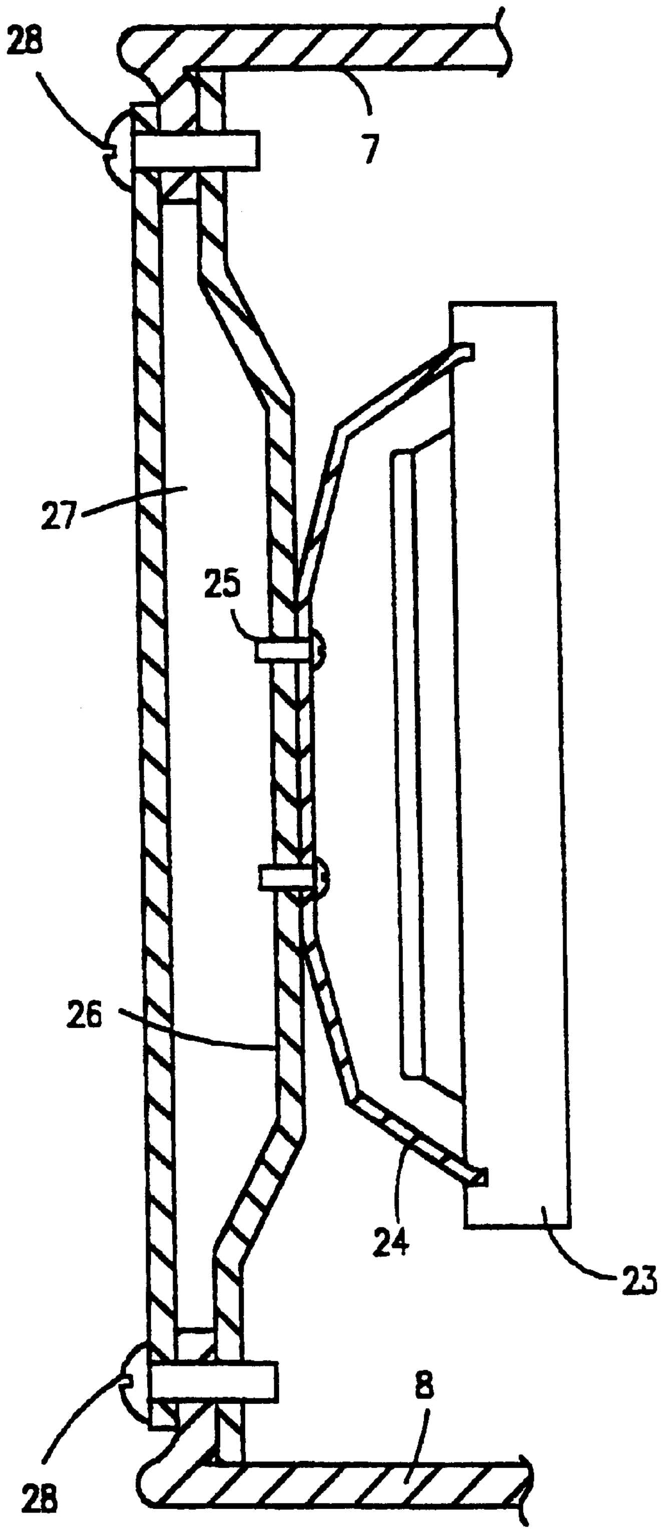

As will be seen from FIG. 4, the bottom of the body 2 is screened closed by a bottom panel 27, the edges of which are likewise screwed by screws 28 to the bottom flanges of the body 2.

Referring once again to FIG. 2 it will be seen that element 18 is confined within circular outlines, whereas the adjoining element 19, forming an extension of the heated surface area toward the right-hand side in FIGS. 1 and 2 as moon-crescent outlines, stretched out longitudinally in the longitudinal direction of the hot plate to an extent which depends on the elongation of the hot plate.

The claims which follow are to be considered an integral part of the present disclosure. Reference numbers (directed to the drawings) shown in the claims serve to facilitate the correlation of the integers of the claims with illustrated features of the preferred embodiments, but are not intended to restrict in nay way the language of the claims to what is shown in the drawings, unless the contrary is clearly apparent from the context.

What is claimed is:

1. A table top model hot plate or warming plate appliance comprising a vitreous ceramic top (1) mounted on a body (2), including peripheral side walls and enclosing one or more heating elements (18, 19) underneath the vitreous ceramic top (1), the side walls (100) of the appliance being upright, and terminating in formations, supporting and positioning edges of said vitreous ceramic top which has substantially circular to oval outlines, wherein the side walls (100) of the appliance have circular to oval outlines in plan view, substantially following the outlines of the vitreous ceramic top (1) except for a hollow protrusion (101) forming a substantially planar control panel surface which on one side merges substantially tangentially with the circular to oval outlines of the said side walls (100) and on the other side terminates in a corner-forming wall (13), returning to meet the side walls having circular to oval outlines, the hollow protrusion (101) forming a box-like cavity accommodating control apparatus (115) for the heating elements (18, 19) and the control panel carrying one or more operating and/or control buttons (96), touch pads, knobs and/or dials and optionally one or more pilot lights (17).

2. A table top model as claimed in claim 1, wherein the corner forming wall (13) is at a right angle to the control panel (102).

3. A table top model as claimed in claim 1, wherein the corner-forming wall (13) meets the circular to oval outlines (10) in non-tangential relationship (14).

4. A table top model as claimed in claim 2, wherein the corner-forming wall (13) meets the circular to oval outlines (10) in non-tangential relationship (14).

5. A table top model as claimed in claim 1, wherein the plan view outlines of the side walls (100) are defined at one end by a hemicircle (6), its two hemicircle ends merging tangentially with two parallel rectilinear portions (7, 8) one of which (7) in turn merges tangentially with the first end of a further circle segment, whereas the other (8) continues rectilinearly to form the control panel (102), terminating at its far end in said corner forming wall (13) which latter meets the second end of said further circle segment (10).

6. A table top model as claimed in claim 2, wherein the plan view outlines of the side walls (100) are defined at one end by a hemicircle (6), its two hemicircle ends merging tangentially with two parallel rectilinear portions (7, 8) one of which (7) in turn merges tangentially with the first end of a further circle segment, whereas the other (8) continues rectilinearly to form the control panel (102), terminating at its far end in said corner forming wall (13) which latter meets the second end of said further circle segment (10).

7. A table top model as claimed in claim 1, wherein the plan view outlines of the side walls (100) are defined at one end by a hemicircle (6), its two hemicircle ends merging tangentially with two parallel rectilinear portions (7, 8) one of which (7) in turn merges tangentially with the first end of a further circle segment, whereas the other (8) continues rectilinearly to form the control panel (102), terminating at its far end in said corner forming wall (13) which latter meets the second end of said further circle segment (10).

8. A table top model as claimed in claim 4, wherein the plan view outlines of the side walls (100) are defined at one end by a hemicircle (6), its two hemicircle ends merging tangentially with two parallel rectilinear portions (7, 8) one of which (7) in turn merges tangentially with the first end of a further circle segment, whereas the other (8) continues rectilinearly to form the control panel (102), terminating at its far end in said corner forming wall (13) which latter meets the second end of said further circle segment (10).

9. A table top model as claimed in claim 5, wherein the outside of the corner-forming wall (13) meets the outside of the further circle segment (10) at an obtuse angle.

10. A table top model as claimed in claim 6, wherein the outside of the corner-forming wall (13) meets the outside of the further circle segment (10) at an obtuse angle.

11. A table top model as claimed in claim 7, wherein the outside of the corner-forming wall (13) meets the outside of the further circle segment (10) at an obtuse angle.

12. A table top model as claimed in claim 8, wherein the outside of the corner-forming wall (13) meets the outside of the further circle segment (10) at an obtuse angle.

13. A table top model as claimed in claim 5, wherein the heating elements comprise a first element having circular outlines (18) and a second element (19) having moon crescent-shaped outlines adjoining the first element.

14. A table top model as claimed in claim 6, wherein the heating elements comprise a first element having circular outlines (18) and a second element (19) having moon crescent-shaped outlines adjoining the first element.

15. A table top model as claimed in claim 7, wherein the heating elements comprise a first element having circular outlines (18) and a second element (19) having moon crescent-shaped outlines adjoining the first element.

16. A table top model as claimed in claim 8, wherein the heating elements comprise a first element having circular outlines (18) and a second element (19) having moon crescent-shaped outlines adjoining the first element.

* * * * *